United States Patent [19]
Schoultz

[11] Patent Number: 5,778,922
[45] Date of Patent: Jul. 14, 1998

[54] HYDRAULIC DEVICE AND SYSTEM

[76] Inventor: Carl Louis Schoultz, 350 Harwicke Rd., Springfield, Pa. 19064

[21] Appl. No.: 701,719

[22] Filed: Aug. 22, 1996

[51] Int. Cl.$^6$ .................................................. F04F 1/00
[52] U.S. Cl. ........................ 137/208; 137/571; 222/386.5
[58] Field of Search ............................. 137/208, 571; 222/386.5

[56] References Cited

U.S. PATENT DOCUMENTS

| | | | |
|---|---|---|---|
| 308,563 | 11/1884 | Kauke | 137/209 |
| 2,529,937 | 11/1950 | Hale | 222/386.5 X |
| 3,473,565 | 10/1969 | Blendermann | 137/593 |
| 4,109,831 | 8/1978 | Culpepper et al. | 222/386.5 X |

*Primary Examiner*—Gerald A. Michalsky
*Attorney, Agent, or Firm*—Michael F. Petock, Esq.

[57] ABSTRACT

A hydraulic system, device and method for dispensing fluids. Water and air are preferred. At least two tanks are preferably used for holding water under air pressure. In a preferred embodiment, one of the tanks is at a higher elevation than the second, so there is an additional pressure drop added to the pressure in the second or lower tank. The tanks have valves for introducing and discharging air under pressure. The tanks further include pipes extending into each to a point proximate one surface, such as the bottom, so that fluid enters and exits the container as close to the one surface as possible. Water is pumped into at least one of the containers to permit transfer of water between the tanks. Air hoses equalize pressure in the two containers. A discharge valve is employed for discharging fluid from one of the tanks under the equalized pressure. Prior to discharging any water, water and/or air is added to one of the tanks. The increase in pressure inside the tank is transferred to the other tank. The second tank is now capable of discharging the fluid contained therein under the increased pressure. In another embodiment, a bladder is located inside the tank such that the water is contained in the bladder and the air is outside to facilitate the changes in pressure and provide a steady response to these changes. A more regulated flow is achieved when water is discharged from the second or other tanks.

5 Claims, 1 Drawing Sheet

HYDRAULIC DEVICE AND SYSTEM

FIELD OF THE INVENTION

The present invention relates to a hydraulic device for transferring fluid under pressure. More particularly the present invention relates to a device and system that transfers water or other hydraulic fluids held under pressure between at least two holding tanks such that the pressure is equalized between the tanks and the water or other fluid is dischargeable at a pressure that is higher than that of a single tank.

BACKGROUND OF THE INVENTION

The ancient Greek cultures said that all of creation was made from earth, fire, air and water. Each has been a basic necessity as humanity has developed from pre-history to present day modern civilization, such that, even today, water and air are fundamental to the needs of society. Of course, we take for granted that we can breathe the air and drink the water, at least as it is in the more affluent areas of the United States, where clean air and water are available. But beyond drinking water and breathing air, these two materials are needed for an endless variety of functions and services to make our lives better and easier. One simple requirement is the ability to transfer water under pressure, whether to spray water on fires, to water gardens, to wash cars or buildings or other objects, to refresh, and even to beautify via fountains that spray water for the joy and beauty that it brings.

In most industrialized communities, water under pressure does exist, at tap pressures at least, which are all that is normally needed for most uses. However, when increased pressure is needed, such as with fire fighting equipment or high pressure cleaning processes, pumps are used to increase the pressure on the water to thus expel it at a higher velocity, so that longer distances or harder impact may be achieved.

In most cases the transfer of water under pressure involves the use of pumps, either to mechanically increase the flow of liquid directly or to build a head of pressure behind the water to thus increase it's flow via pressure. Both such methods require the expenditure of energy, such as in the form of motors driving the pumps, for example. In addition, use of fluids such as water under pressure at locations remote from the source of such power requires either that the motors and pumps be transported to that remote location or that the pressurized water be transferred over a distance from the energy source to reach the point of use.

In both cases, inefficiencies make the use of such a method less than satisfactory. Often times, large and expensive equipment is needed to transport the pressure generating means to the remote location. Such construction is often permanent and requires the expenditure of large amounts of capital. In other circumstances, great power loss is encountered as the fluid, such as water, travels long distances via less than 100% efficient transfer means.

Accordingly, it is an object of the present invention to provide a device, system and method for transferring fluids such as water without the use of additional equipment and expense.

Another object of this invention is to provide a device which is capable of using latent or static energy of hydraulic fluids without large expenditures for capital equipment to transfer such fluids to other, remote locations.

Still another object of the present invention is to provide a portable device for generating water under pressure at locations that are remote from other power sources.

Other objects will appear hereinafter.

SUMMARY OF THE INVENTION

It has now been discovered that the above and other objects of the present invention may be accomplished in the following manner. Specifically, the present invention provides a hydraulic system, device and method useful for dispensing hydraulic fluids such as water. Included is a hydraulic fluid source and a source of gas which may be ambient air, or a gas under pressure or vacuum in some instances.

While the invention may be used with any hydraulic fluid and any gas, it is preferred that water and air be the fluids of choice, due to availability, cost and environmental compatibility. One or more tanks are used for holding water under air pressure or its own pressure. It is also contemplated that three or more tanks be used, in series or in parallel, so that the advantages of the present invention may be multiplied.

In a preferred embodiment, one of the tanks is placed at a higher elevation with respect to the second or other tanks, so that there is, in addition to the pressure caused by the fluid and gas inside the respective tanks, a pressure drop—for water it is 2.31 feet per psi—is added to the pressure in the second or lower tank. Various schemes can be imagined where one elevated tank is connected to several lower tanks. Alternatively, several elevated tanks in series could be connected on a downward cascade, so that each tank is coupled to a lower tank to achieve multiplication of the pressure transfer according to the invention.

Each of the tanks have valves for introducing and discharging air under pressure. Air may be added to any of the tanks, but since the connections are made between each tank, it is only necessary to provide pressure or vacuum input to one tank and allow for pressure equalization to take place. Alternatively, each tank may be connected to the other for gas/air communication without external or above atmosphere pressure. In other words, the tanks may be connected for open air flow there between as desired.

The tanks further include pipes extending into each to a point proximate one surface, such as the bottom, so that fluid enters and exits the container as close to the one surface as possible. When two tanks are used at different elevations, it is desirable that the pipe extend to a location proximate the bottom, so that air does not enter the water transfer pipes, if at all, until substantially all the water has been withdrawn from that tank.

Water is initially transferred into at least one of the containers or tanks to permit transfer of water there between. Air hoses equalize pressure in the two containers, whether under elevated pressure as preferred or at ambient pressure in an open system. A discharge valve is employed for discharging fluid from one of the tanks under the equalized pressure. Prior to discharging any water, water and/or air is added to one of the tanks, causing increased hydraulic and air pressure in that tank. This increase in pressure inside the tank is transferred to the other tank or tanks. The second tank is now capable of discharging the fluid contained therein under the increased pressure.

In another embodiment, a bladder is mounted inside the tank such that the water is contained in the bladder so that it serves as a flexible second container within a container. The air is outside the bladder to facilitate the changes in pressure and provide a steady response to these changes. A more regulated flow is achieved when water is discharged from the second or other tanks as the flexible bladder stretches and contracts during flow of water.

One advantage of the present invention is that it permits the use of one tank as a source tank that can easily be connected to both a gas source and a hydraulic fluid source, while any number of second tanks may be filled or pressurized merely by connection to the first tank. Thus a safe, convenient filling station can operate on permanent basis while regular refilling or charging of other tanks takes place at one or more locations remote from the base.

The present invention provides an output that may also be used as a driving force for water wheels, turbines and the like. It is particularly suitable for use with my invention described in my pending application entitled HYDRAULIC DEVICE, filed Mar. 19, 1996 and having Ser. No. 08/618,103.

BRIEF DESCRIPTION OF THE DRAWINGS

For a more complete understanding of the invention, reference is hereby made to the drawings, in which.

DETAILED DESCRIPTION OF THE PREFERRED EMBODIMENT

Figure 1:
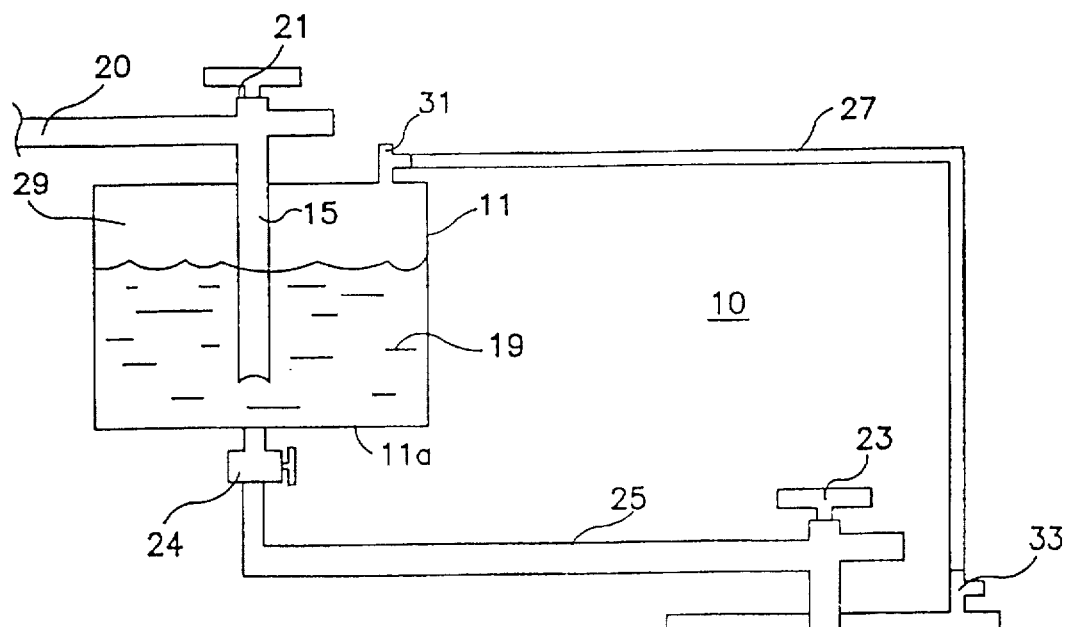
FIG. 1 is a schematic, sectioned, side elevational view of the system of this invention showing the system with two tanks connected in series.

As shown in the drawings, a system 10 generally is provided with two tanks 11 and 13, shown in the preferred embodiment of one being at a higher elevation than the other. It is to be understood that, for the purposes of this invention, the tanks may be in many other orientations, such as side by side at the same elevation. The invention contemplates the use of at least one tank or container, and is not limited to two as shown in the drawings. Any number of tanks or containers that is practical may be connected together in any pattern, whether in series or in parallel or in some combination of both.

In FIG. 1, a preferred embodiment employs two tanks 11, 13 that are connected in series and are at different elevations. Each tank 11, 13 has a pipe 15 extending into the interior, preferably to a point proximate the bottom 11a, 13a of each tank so that the inlet 17 of pipe 15 is as close as practical to that bottom surface 11a, 13a. Fluid 19 is transferred via pipe 20 from a source, not shown, into at least one of the tanks 11, 13, through valves 21, 23. Tanks 11, 13 are connected to permit transfer of fluid there between via outlet valve 24 through pipe 25 and into valve 23.

For the purposes of this invention, water is the preferred fluid since it is normally readily available, low in cost, and relatively safe for the environment. Water is a useful source of energy and can be used with turbines and the like to convert kinetic energy into rotational energy to generate power. Also, water is needed in fire fighting activities for certain types of combustion. For other types of combustion, other fluids that are more suitable may be used, such as for electrical fires and certain chemical combustion where water aggravates rather than extinguishes the combustion. Water is also used in cleaning surfaces by high pressure washing and the like. The water may include soaps, polisher or waxes, or other ingredients as long as the composite functions as a fluid and flows through the system as desired. Again, other cleaning fluids may be used as circumstances dictate. Of course, other uses of the present invention will be found that employ other fluids, depending on the specifics of the end use of the invention.

Similarly, air is the preferred gas, again because of availability, cost and environmental concerns. Of course, where oxygen is not desired, or for other reasons, other gasses may be employed without departing from the spirit of this invention.

Tanks 11, 13 are also connected by air pressure line 27, via valves 31, 33, as shown in FIG. 1. Valves 31, 33 may be connected to a source of air, not shown, to add air to either tank. Air line 27 permits the two tanks 11, 13 to have equalized air pressure 29, above water 19. It should be noted that the system 10 may be pressurized, as described above, or may be open. In such a case where the system is open and not under additional air pressure, valves 31, 33 communicate directly to the atmosphere and air flows via air line 27 at atmospheric pressure as well. In either case, whether tanks 11, 13 are pressurized or open, the pressure in both tanks 11, 13 will be the same.

In the embodiment shown in FIG. 1, tank 11 is at a higher elevation than tank 13, so that there is, in addition to the pressure caused by the water and air inside the tanks 11, 13, there is a pressure drop—for water it is 2.31 feet per psi—that is added to the pressure in the second or lower tank 13. As the two tanks seek equilibrium via water transfer pipe 25 and air line 27, the two tanks 11, 13 water is transferred because the tanks are at different levels.

The system of this invention is operated as follows. Water is pumped into one tank, tank 11 for example, via pipe 20 and valve 21. Water then transfers to tank 13 via valve 24 and pipe 25, through valve 23, until an a desired state is reached. If desired, once a predetermined amount of water has been transferred, valve 21 or 23 may be closed to prevent further flow. Air line 27 equalizes pressure in tanks 1 1, 13, whether under elevated pressure as preferred by adding air to valve 31, for example, or at ambient pressure in an open system.

Prior to discharging any water, water and/or air is added to one of the tanks, causing increased hydraulic and air pressure in that tank. In one example, water may be added to tank 11, thus increasing the pressure of the air 29 as it is compressed into less volume. This increase in pressure inside tank 11 is transferred to tank 13 via air line 27. Tank 13 is now capable of discharging water contained therein under the increased pressure. When the system is operated in reverse, of course, the pressure 29 in tank 11, for example, may be less than ambient, such as at a vacuum. It is contemplated that the device of this invention may be operated in either direction, depending upon need.

Alternatively, air may be added under pressure to tank 11 via valve 31, again increasing air pressure at 29 and again transferring this increased pressure to tank 13 via air line 27, so that air pressure 29 in tank 13 is increased. Valve 26 may now be used to discharge the water under higher pressure, for example, when needed to douse a fire or to wash a car or other object.

As previously noted, the discharge from the present invention is suitable for use with my invention described in my pending application entitled HYDRAULIC DEVICE, filed Mar. 19, 1996 and having Ser. No. 08/618,103. Specifically, fluid discharged from an exit pipe in bottom 13a of tank 13, via valve 26, water under pressure enters a wheel device 28, illustrated schematically with wheel 30 that is turned by water pressure from valve 26, thus generating power and exiting via pipe 32 to discharge. Wheel device 28 may be the device of my above referenced invention or it may be any other form of rotating element that transfers energy from flowing liquids to another form of energy such as that derived from rotation of a shaft.

Figure 2:
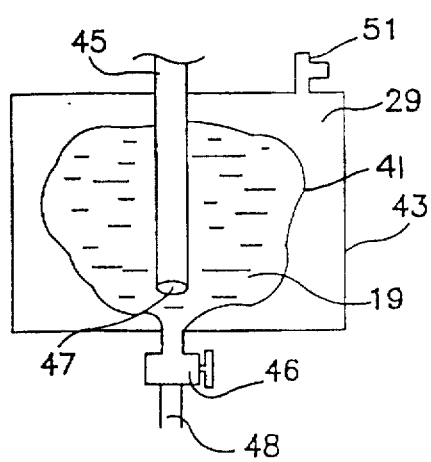
FIG. 2 is an enlarged, sectioned, side elevational view of an alternative embodiment of the invention shown in FIG. 1.

In another embodiment, shown in FIG. 2, an internal bladder 41 is fitted within tank 43, such that the bladder 41 encloses the water 19 in a flexible, stretchable container that sealingly receives pipe 45 so that discharge end 47 of pipe 45 is in direct communication with water 19. Air 29 surrounds bladder 41 as previously describes and is introduced or withdrawn via valve 51. Air 29 outside the bladder facilitates the changes in pressure and provide a steady response to these changes as it expands against it's elastic composition or contracts using that elasticity so that a more regulated flow is achieved. The flexible bladder stretches and contracts during flow of water to reduce or eliminate surges of water flow. Water may be removed from bladder 41 through the bottom of tank 43 via valve 46 and pipe 48, for use as described above, or water may be drawn from bladder 41 into discharge end 47 of pipe 45.

As noted above, one particularly useful advantage of the present invention is that it permits the use of one tank as a source tank that can easily be connected to both water and air at that location, while any number of second tanks may be filled or pressurized merely by connection to the first tank. Thus a safe, convenient filling station can operate on permanent basis while regular refilling or charging of other tanks takes place at one or more locations remote from the base.

While particular embodiments of the present invention have been illustrated and described, it is not intended to limit the invention, except as defined by the following claims.

What is claimed is:

1. A hydraulic system useful for dispensing hydraulic fluids using a source of hydraulic fluid and a source of gas, comprising:

an upper hollow container and a lower container for holding hydraulic fluid therein, each of said containers having gas valve means for introducing and discharging gas into said container and for gas transfer between said containers; said containers further including hydraulic fluid flow means extending into each said container from one end thereof to a point proximate the opposing inner surface of the other end thereof such that hydraulic fluid enters and exits said container proximate said other end;

fluid transfer means for introducing hydraulic fluid from said hydraulic fluid source into said upper container for hydraulic fluid flow therein, said fluid transfer means further connecting said upper and lower containers for fluid flow there between;

valve means operably connected with said gas valve means prevent discharge of air in said second container during transfer of hydraulic fluid from said first container to said second container to store a head of air pressure in said lower container; and means for discharging hydraulic fluid from said lower container under said pressure at a time after said head of pressure has been stored therein.

2. The system of claim 1 where said lower hollow container includes bladder means connected to said hydraulic fluid flow means such that hydraulic fluid in said container is within said bladder means and said gas pressure inside said container is outside said bladder means.

3. The system of claim 1, where the hydraulic fluid is water and the gas is air.

4. The system of claim 1, wherein said valve means operably connected with said gas valve means prevent discharge of air in said upper container during transfer of hydraulic fluid into said upper container to store a head of air pressure in said upper container for use when transferring hydraulic fluid to said lower container.

5. A hydraulic system useful for dispensing water using a source of water and a source of air, comprising:

an upper hollow container and a lower container for holding water therein, each of said containers having air valve means for introducing and discharging air into said container and for air transfer between said containers; said containers further including water flow means extending into each said container from one end thereof to a point proximate the opposing inner surface of the other end thereof such that water enters and exits said container proximate said other end;

water transfer means for introducing water from said water source into said upper container for water flow therein, said water transfer means further connecting said upper and lower container for water flow there between;

valve means operably connected with said air valve means prevent discharge of air in said second container during transfer of water from said first container to said second container to store a head of air pressure in said lower container, said valve means being operably connected with said air valve means to prevent discharge of air in said upper container during transfer of hydraulic water into said upper container to store a head of air pressure in said upper container for use when transferring hydraulic water to said lower container;

said upper and lower hollow containers including bladder means connected to said water flow means such that water in said container is within said bladder means and said air pressure inside said container is outside said bladder means; and means for discharging water from said lower container under said pressure at a time after said head of pressure has been stored therein.

* * * * *